March 19, 1963    J. P. JORDAN ET AL    3,082,048
HUB AND SHAFT WITH FORMED SETSCREW COLLAR
Filed May 19, 1960
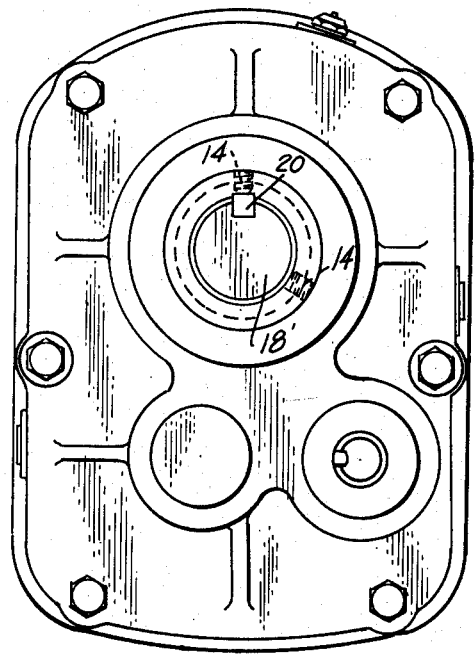
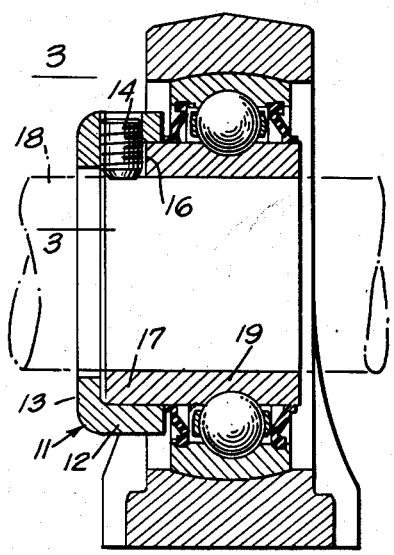
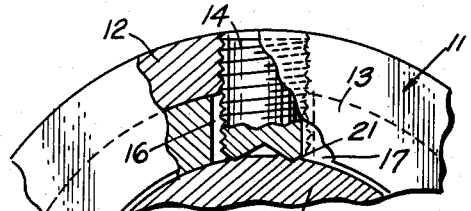
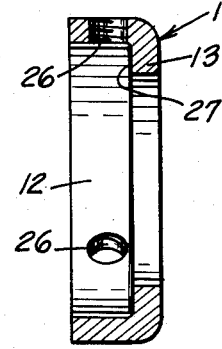
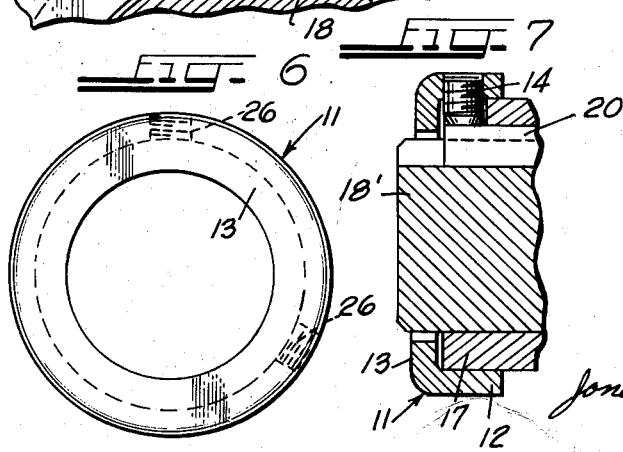
INVENTORS:
JOHN PAUL JORDAN
DAVID FIRTH
BY Jones, Garbos Robertson
Att'ys.

United States Patent Office 3,082,048
Patented Mar. 19, 1963

3,082,048
HUB AND SHAFT WITH FORMED
SETSCREW COLLAR
John Paul Jordan, Mishawaka, and David Firth, South Bend, Ind., assignors to Dodge Manufacturing Corporation, Mishawaka, Ind., a corporation of Indiana
Filed May 19, 1960, Ser. No. 30,378
5 Claims. (Cl. 308—236)

One of the most ancient ways of securing hubs of wheels, pulleys, bearing races and the like to shafts is by one or more setscrews screwed in the hub firmly enough to press into the shaft. This is subject to some objections. If the hub is part of a bearing race and is close to the race portion thereof the distortion resulting from tightening the setscrew can be very objectionable. For this reason, the assignee of the present applicants has heretofore used heavy machined steel collars surrounding such hubs with the screws threaded into the collar but passing through the hub in unthreaded relationship therewith. This has successfully avoided distortion of raceways.

A commonly encountered difficulty with the setscrew manner of securing is that the burr which the hardened setscrew makes on the shaft makes removal of the shaft from within the hub difficult. It will be understood that hubs commonly must fit the shaft quite snugly. Another difficulty when the setscrew screws through the hub is that setscrews tend to loosen, due partly to vibration. Because of the snug fit between the hub and the shaft, as well as the heavy cross section of the hub, there is no appreciable resiliency to keep the screw firmly against the shaft and prevent its shaking loose.

According to the present invention, an improved collar-held setscrew arrangement is provided which alleviates all of these past difficulties and also permits economy of manufacture. Instead of a heavy collar surrounding the hub, the portion of a collar surrounding the hub is relatively light and strength is obtained from a radial flange which may lie along the end of the hub. This collar may be formed from sheet steel. Strength is obtained by locating the setscrew adjacent to the flange. This location of the setscrew, especially if immediately adjacent or contiguous to the flange, lends itself to providing a hole through the hub which intersects the end of the hub or is connected to the end by an open slot so that the burr formed on the shaft by the setscrew can be moved through the slot without difficulty. The slot is narrower than the setscrew so that the setscrew still positions the hub.

Additional objects and advantages of the invention will be apparent from the following description and from the drawings.

Designation of Figures

FIG. 1 is an end view of a speed reducing mechanism representing one place in which this invention may be used, and showing the invention as applied thereto.

FIG. 2 is a sectional view taken approximately along an axial plane through a bearing assembly including a preferred form of the present invention.

FIG. 3 is a fragmentary sectional view taken approximately along the line 3—3 of FIG. 2 with portions broken away to different depths.

FIG. 4 is a fragmentary view of the peripheral surface of a hub as seen from a position in alignment with a setscrew passage.

FIG. 5 is a diametric or axial sectional view taken through a collar of this invention such as is shown in FIG. 2.

FIG. 6 is an outer face view of the collar shown in FIG. 5.

FIG. 7 is a view showing the collar of this invention used in a construction in which the setscrew engages a key, as at the upper set screw position in FIG. 1.

General Description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the shief aid toward this purpose, as it is these that meet the requirement of pointing out the parts, improvements, or combinations in which the inventive concepts are found.

According to the present invention a collar 11 is formed from sheet metal such as cold-rolled steel to provide a sleeve portion 12 and a flange portion 12. A setscrew 14 is threaded through the sleeve portion 12 and passes in unthreaded engagement through a passage 16, through hub 17 which is to be secured to shaft 18. The hub 17 may be the extension of a bearing race 19 as illustrated in FIG. 2, or it may be the extension of a power transmitting member as suggested by the key 20 in FIGS. 1 and 7 in shaft 18'.

The setscrew 14 is tightened firmly against and usually slightly into the shaft 18, or firmly against and possibly into key 20.

Setscrews are usually cup-pointed as shown in the drawings. They are usually hardened and dig into the shaft or other member against which they are tightened (unless it is even harder) and form small burrs thereon, such as shown at 21, in FIG. 3.

As seen in FIGS. 3 and 4, the setscrew passage 16 through the hub 17 preferably is provided on the side toward the end face 22 of the hub with an opening 23 wide enough to permit passage of the burrs 21 if the hub 17 and shaft 18 are relatively moved in a direction axial of the shaft. Of course this helps only if the shaft moves in the direction end face 22 faces. But often conditions will permit such movement initially (for filing down the burrs) even if the ultimate movement is to be in the opposite direction.

The opening 23 may be formed as illustrated in FIG. 4 by intersection of the passage 16 with the face 22. Alternatively the passage 16 may be set further back with respect to face 22, and the opening 23 formed by separate cutting or grinding. In that event, the opening need not extend the full length of passage 16.

Details of Collar

An important consideration is the location of the threaded holes 26 with respect to the flange 13 of the collar 11. In a sense, an ideal spacing is zero, so that the threads of the screw 14 will just contact the inner face 27 of the flange 13. The screw, or the side thereof adjacent the flange 13 would then have virtually zero length leverage with which to distort the sleeve 12 about its junction with the flange 13. However, since it is contemplated that fairly thick cold-rolled steel sheet stock will be used this ideal does not need to be achieved. A satisfactory collar has been made with the screw spaced from the flange 13 by a distance equal to the thickness of the metal. It should be close enough to the flange 13 so that the maximum tightening force likely to be applied to the screw will not cause permanent distortion of the sleeve 12. A spacing between the screw and the inner face of the flange 13 not over half the thickness of the metal in the flange 13 is at present preferred partly because it gives an adequate margin of safety, and partly because it is preferred that there be no appreciable cocking of the setscrews as they are tightened. With the setscrew spaced from the flange 13 not over one-half of the thickness of the metal, the distortion of the collar upon tightening the setscrew appears to be planar, so that the axis of the setscrew remains unchanged, or substantially so.

Some planar resiliency of the collar is desired so that as the setscrew is tightened the collar will yield resiliently. The stress of the collar will then keep the setscrew firmly applied to the shaft 18 under conditions such that otherwise looseness would appear. In order to give the proper resiliency and strength, the collar characteristics should bear a proper relationship to the setscrew to be used. Setscrews as sold commonly are rated by their manufacturers as to the number of inch-pounds of torque which should be applied to them in tightening them. It is desirable that the characteristics of the collars be such that with the setscrews tightened to their rated torque, the distortion of the collar, measured diametrically adjacent to the setscrew, will be between one and three thousandths of an inch, or at least approximately so.

The collars 11 can be made very inexpensively by a stamping operation, with formation of the sleeve 12 by cold drawing.

Although different materials having different strengths require different dimensions, it may be helpful to note the following relations found suitable:

| Setscrew | | Thickness of Cold-Rolled Steel, inches |
|---|---|---|
| Diameter | Rated Torque, inch pounds | |
| ¼ | 62 | $3/16$ |
| $5/16$ | 122 | ¼ |
| ⅜ | 198 | $5/16$ |

From this it may be seen that as a rough generalization, the thickness of cold-rolled steel should be at least about three-fourths of the setscrew diameter.

From the foregoing it is seen that a hub and shaft combination is provided which, though inexpensive, is exceptionally satisfactory. It maintains tightness of the setscrew, avoids distortion of the hub, and with gap 23, facilitates removal of the hub away from burrs on the shaft.

We claim:

1. A shaft and hub assembly including a shaft, a hub snugly fitting and carried by the shaft and having an end face lying in a radial palne, a formed sheet metal collar having a sleeve portion surrounding the hub and a ring flange integral therewith extending inwardly from the sleeve portion adjacent the face, and a setscrew threaded through the sleeve adjacent to the flange, and extending in unthreaded relation through a radial passage in the hub of generally circular cross section approximately fitting the setscrew, but intersecting the face to form an opening therethrough narrower than the diameter of the setscrew but greater than the diameter of the inner end of the setscrew to permit a burr formed thereby on the shaft to pass through the opening.

2. A shaft and hub assembly including a shaft, a hub snugly fitting and carried by the shaft and having an end face lying in a radial plane, a formed collar having a sleeve portion surrounding the hub and a ring flange integral therewith extending inwardly from the sleeve portion adjacent the face, and a setscrew threaded through the sleeve adjacent to the flange, and extending in unthreaded relation through a radial passage in the hub of generally circular cross section approximately fitting the setscrew, but intersecting the face to form an opening therethrough narrower than the diameter of the setscrew but greater than the diameter of the inner end of the setscrew to permit a burr formed thereby on the shaft to pass through the opening.

3. A shaft and hub assembly including a shaft, a hub snugly fitting and carried by the shaft and having an end face lying in a radial plane, a formed collar having a sleeve portion surrounding the hub and a ring flange integral therewith extending inwardly from the sleeve portion adjacent the face, and a setscrew threaded through the sleeve adjacent to the flange, and extending in unthreaded relation through a radial passage in the hub of generally circular cross section approximately fitting the setscrew, but having an opening through the face narrower than the diameter of the setscrew but greater than the diameter of the inner end of the setscrew to permit a burr formed thereby on the shaft to pass through the opening.

4. A shaft and hub assembly including a shaft, a hub snugly fitting and carried by the shaft and having an end face lying in a radial plane, a formed collar having a sleeve portion surrounding the hub and a ring flange integral therewith extending inwardly from the sleeve portion adjacent the face, and a setscrew threaded through the sleeve adjacent to the flange, and extending in unthreaded relation through a radial passage in the hub of generally circular cross section approximately fitting the setscrew, but having an opening through the face narrower than the diameter of the setscrew but greater than the diameter of the inner end of the setscrew to permit a burr formed thereby on the shaft to pass through the opening; the characteristics of the collar being such that with the setscrew tightened with its rated torque, the collar is resiliently distorted along a diameter from 1 to 3 thousandths of an inch.

5. A shaft and bearing assembly including a shaft, a bearing race snugly fitting and carried by the shaft and having an axially facing annular shoulder, a collar surrounding the race, and a setscrew threaded through the collar adjacent to the shoulder, and extending through a passage in the race in unthreaded relation therewith in which the passage is open on one side through the shoulder, the opening being narrower than the diameter of the setscrew but greater than the diameter of the inner end of the setscrew to permit a burr formed thereby on the shaft to pass through the opening.

References Cited in the file of this patent

UNITED STATES PATENTS

| 895,408 | Hallowell | Aug. 4, 1908 |
| 1,612,465 | Parsons | Dec. 28, 1926 |
| 2,113,017 | Deschamps | Apr. 5, 1938 |
| 2,138,659 | Kindig | Nov. 29, 1938 |
| 2,739,830 | Firth | Mar. 27, 1956 |